US005870430A

United States Patent [19]
Pipon et al.

[11] Patent Number: 5,870,430
[45] Date of Patent: Feb. 9, 1999

[54] PROCESS FOR MULTI-SENSOR EQUALISATION IN A RADIO RECEIVER IN THE PRESENCE OF INTERFERENCE AND MULTIPLE PROPAGATION PATHS

[75] Inventors: François Pipon, Paris; Pascal Chevalier, Courbevoie; Pierre Vila, Rueil Malmaison, all of France

[73] Assignee: Thomson-CSF, Paris, France

[21] Appl. No.: 773,128

[22] Filed: Dec. 26, 1996

[51] Int. Cl.⁶ ...................................................... H03H 7/30
[52] U.S. Cl. .......................... 375/229; 375/229; 375/347; 375/299; 455/137; 455/273
[58] Field of Search ..................................... 375/347, 349, 375/350, 229, 232, 233, 200, 299, 285; 455/137, 273

[56] References Cited

U.S. PATENT DOCUMENTS

| | | | |
|---|---|---|---|
| 5,194,873 | 3/1993 | Sickles, II | 342/374 |
| 5,327,458 | 7/1994 | Yamamoto | 375/230 |
| 5,467,374 | 11/1995 | Chennakeshu et al. | 375/340 |
| 5,487,085 | 1/1996 | Wong-Lam et al. | 375/230 |
| 5,646,958 | 7/1997 | Tsujimoto | 375/233 |

OTHER PUBLICATIONS

Philip Balaban, et al., IEEE Transactions on Communications, vol. 40, No. 5, pp. 885–894, May 1, 1992, "Optimum Diversity Combining and Equalization in Digital Data Transmission with Applications to Cellular Mobile Radio–Part I: Theoretical Considerations".

Ken E. Scott, et al., Institute of Electrical and Electronics Engineer, vol. 3 of 3, pp. 1463–1468, Jun. 23–26, 1991, "Antenna Diversity with Multichannel Adaptive Equalization in Digital Radio".

Hidekazu Murata, et al., Institute of Electrical and Electronics Engineers, No. CONF. 43, pp. 750–753, May 18–20, 1993, "Adaptive Receiver Consisting of Viterbi Equalizer and Sector–Antenna Diversity for Cellular Radio".

M. Stojanovic, et al., Journal Of The Acoustical Society Of America, vol. 94, No. 3, pp. 1621–1631, Sep. 1993, "Adaptive Multichannel Combining and Equalization for Underwater Acoustic Communications".

*Primary Examiner*—Stephen Chin
*Assistant Examiner*—Shuwang Liu
*Attorney, Agent, or Firm*—Oblon, Spivak, McClelland, Maier & Neustadt, P.C.

[57] ABSTRACT

The process according to the invention consists, in order to reduce the number of coefficients of the filters of the spatial part and the temporal part connected to the output of the spatial part, in jointly adapting the coefficients of the filters of each part using an adaptive algorithm according to the paths selected on the basis of a determined criterion. The coefficients are periodically recalculated at the rate of the known symbols in the learning sequences in order to minimize the estimation error apparent between a response signal (d(t)) and the receiver output signal (z(t)).

9 Claims, 5 Drawing Sheets

PROCESS FOR MULTI-SENSOR EQUALISATION IN A RADIO RECEIVER IN THE PRESENCE OF INTERFERENCE AND MULTIPLE PROPAGATION PATHS

BACKGROUND OF THE INVENTION

This invention concerns a process for multisensor equalization in a radioelectric receiver consisting of demodulating a digital message in the presence of multi-propagation paths and interfering sources, reducing the number of factors to be adapted necessary for the multisensor equalizer calculation, for modulations formed of frames comprising learning sequences and information symbol sequences. The invention also concerns a radioelectric receiver embodying such a process. The invention is based on antenna processing techniques, and therefore requires the use of a network comprising several sensors.

There are many fields of application of this invention, all concerning communications that need an equalizer to perform the single sensor demodulation, such as for example:

high throughput modulation (2400 bit/s, etc.) in the high frequency (HF) range, modulations of systems in the V/UHF range such as GSM, DECT, etc.

For many applications in digital radio communication, transmission between the transmitter and the receiver takes place along several propagation paths:

in the HF range, multi-propagation paths output from reflections on the various ionospheric layers may be spaced by 5 ms, or several times the symbol duration in the case of modulations with a typical band width of 3 kHz.

in the V/UHF range, for very high GSM type throughputs (270 kbit/s, giving a symbol duration of 3.7 $\mu$s) in urban or mountainous environments, the various paths originating from reflections on various obstacles (buildings, mountains, etc.) may be separated by 10 or even 20 $\mu$s.

Since the delay time for these various applications may exceed the symbol duration, equalization becomes necessary to compensate for the inter-symbol interference (IIS) thus generated. In many systems currently in service, adaptation to these propagation conditions is made possible by insertion of the known receiver learning sequence in the wave shape. Different solutions are then possible for adaptive equalization of the received useful signal.

The first two solutions described below concern single sensor equalization. Antenna filtering techniques described below use multisensors.

A first solution consists in using a Viterbi algorithm which requires a prior estimation of the propagation channel using the learning sequence. This equalisation method has the advantage of minimising the probability of error across the whole sequence of information symbols, but becomes very costly when the duration of the pulse response of the channel is much greater than the symbol duration. In fact, the number of states that the Viterbi algorithm must process is equal to $M^L$, where M is the size of the modulation alphabet and L is the length of the pulse response of the channel expressed as a number of symbol periods. This solution is used for GSM type applications where the Viterbi algorithm typically consists of 32 states (L=5 and M=2).

In the HF band, the particular field of application of the invention, the number of states becomes too great for the Viterbi algorithm to be practically realisable (typically, M is 4 or 8, while L is equal to 12, which corresponds to a pulse response spread over 5 ms), and a second solution using a DFE equaliser is often used.

This second solution consists in using learning sequences as the response of an adaptive algorithm used to minimise a MQE (Mean Quadratic Error) criterion. This solution uses a "Decision Feedback Equaliser" (DFE).

Such an equaliser is intended to supply to a decision module adapted to the modulation in question a signal in which ISI has been eliminated or at least reduced to a great extent. To this end, the DFE equaliser uses transverse and recursive self-adapting filters which are adapted by a least squares type algorithm, preferred to a gradient algorithm for reasons of speed of convergence. The known symbols in the learning sequences are used for the adaptation of the different coefficients. The tracking of channel variations beyond the known sequences is effected using symbols which are selected (detemined) as responses as necessary during the execution of the process.

The single-sensor DFE equaliser can compensate for ISI caused by multiple propagation paths, but is not capable of phase realigning these different paths. Thus, in the presence of two stationary paths of the same amplitude, the DFE equaliser produces losses of approximately 3 dB with respect to a white Gaussian noise channel: it endeavours to retain the contribution of one of the paths and to eliminate the second using the recursive part.

Moreover, in the HF band the different propagation paths are very often affected by flat fading. Fading is a phenomenon linked to the variation of the multiple paths which in turn produces a variation of the received power, or even in extreme cases fading or dying out of the signal paths. When fading is strong, a DFE equaliser's performance is seriously reduced.

In addition, these techniques rapidly become inefficient in the presence of jamming, which means that it is necessary to use known specific anti-jamming techniques such as error correction encoding, elimination of jamming by notched filtering, use of frequency evasion links, etc. These techniques are used in many operational systems, but are nonetheless of limited effect when interference is strong and occupies the whole of the useful signal band. In such conditions, it is necessary to use more effective anti-jamming means based on the use of antenna filtering techniques.

Antenna filtering techniques appeared in the early 1960's. One in particular is described in an article of P. W. HOWELLS "Explorations in fixed and adaptive resolution at GE and SURC", IEEE Trans-Ant-Prop, vol. AP-24, no. 5, pp 575–584, Sept. 1976, while an exhaustive synthesis is presented in a doctorate thesis presented by P. CHEVALIER at the University of Paris sud in June 1991 entitled "Antenne adaptative: d'une structure linéaire à une structure non linéaire de Volterra" ("The adaptive antenna: from a linear structure to a non-linear Volterra structure"). These techniques are designed to combine the signals received by the various sensors making up the antenna so as to optimise its response to the useful signal and jamming scenario in question.

The selection of sensors and their disposition is an important parameter which has a central influence on the performance of the system. Three basic configurations are possible:

the sensors are identical and disposed at different points in space, discrimination between the useful signal and interference being effected according to the direction of arrival;

the sensors are all disposed at the same point in space (colocalised antenna) and have different radiation diagrams. This means that discrimination can be carried out on the basis of polarisation and direction of arrival;

the two configurations described above can be combined: several colocalised antennas can be disposed at different points in space.

In addition, since propagation and jamming conditions can change over time, it is essential that the system be capable of adapting the antenna to these variations in real time through the use of a particular antenna filtering technique: the adaptive antenna. An adaptive antenna is one which detects and reacts to sources of interference automatically by constructing holes in its radiating diagram in their direction, while at the same time improving reception of the useful source, without any prior knowledge of the interference and on the basis of a minimal amount of information on the useful signal. Moreover, the tracking capabilities of the algorithms used make an adaptive antenna able to respond automatically to a changing environment.

Adaptive antennas are characterised by the way in which they discriminate between the useful signal and interference, i.e. by the nature of the information relating to the useful signal which they use. This discrimination process can be carried out in one of five different ways:

according to direction of arrival, according to modulation, according to time, for example, with frequency evasion links, according to power, blindly (for example, higher order source separation methods).

Up until very recently, transmission systems have always been based upon the independent operation of single-sensor adaptive equalisation and adaptive antenna techniques, which results in less than optimised performance.

Thus, the system described in an article by R. Dobson entitled "Adaptive antenna array", patent no. PCT/AU85/00157 of February 1986, which uses discrimination according to time, is efficient in terms of interference rejection, but makes no attempt to improve the useful signal to noise ratio.

In a transmission context, and when learning sequences are introduced into the wave form, it is preferable to use antenna processing techniques based on discrimination according to modulation, as these techniques enable optimisation of the useful signal to noise ratio. Most techniques used nowadays attribute complex weightings to each of the sensors of the adaptive antenna. Such an antenna is capable of rejecting interference, but in the presence of multiple propagation paths:

it "aligns" on the direction of one of the paths, i.e. it phase realigns the contributions of this path on the various sensors (for omnidirectional sensors, a signal to noise ratio gain of 10 log N is obtained, where N is the number of sensors used), it also attempts to eliminate non-correlated paths from the signal, thus losing the energy associated with these paths.

In order to improve the performance of this type of antenna processing in the presence of multiple propagation paths, it is possible to combine it with a single-sensor equalisation technique to obtain a multi-sensor equaliser consisting of a spatial part, composed of different filters disposed on each of the reception channels, and a temporal part located at the output of the spatial part. All the filters making up the spatial part and the temporal part are jointly adapted to the same error signal.

Several multi-sensor equalisers have already been proposed and studied, principally in the field of mobile radio transmissions, and these are particularly described in an article by K. E. Scott and S. T. Nichols entitled: "Antenna diversity with Multichannel Adaptive Equalization in Digital Radio" and in an article by P. Balaban and J. Salz entitled "Optimum Diversity Combining and Equalisation in Digital Data Transmission with Applications to Cellular Mobile Radio—Part 1: Theoretical Considerations", IEEE Trans. on Com., vol. 40, no. 5, pp 885–894, May 1992.

Up to now, such equalisers have been intended to combat the selective fading engendered by multiple paths in a non-jammed environment. They consist of Finite Pulse Response filters, one on each channel, followed by an adder then a monodimensional equaliser equalising at the symbol rate. The criterion used for the optimisation of these multi-sensor equalisers is the minimisation of MQE between their output and a response determined by the learning sequences.

In the equaliser proposed by Scott et al, coefficient adaptation is carried out by a least squares algorithm, and its use for a HF channel cannot be envisaged given the wave forms used. Taking into account the temporal spread of the multiple paths, the number of coefficients to be adapted is too great for the algorithm to be able to converge with the learning sequence.

SUMMARY OF THE INVENTION

The aim of the invention is to resolve these problems.

To this end, the invention relates to a process for multi-sensor equalisation in a radio receiver consisting of a spatial part connected to a temporal part composed respectively of a determined number of filters and receiving a radio signal consisting of at least a learning sequence made up of symbols known to the receiver and an information sequence made up of useful symbols, and consisting in a first stage for the preliminary processing of the signal received by the receiver, of the transformation of the signal received by at least two sensors into an equivalent baseband signal, of the sampling of the baseband signal at a rate which is a multiple of the symbol rate and of the filtering of the sampled signal using a low-pass filtering process, wherein, in the presence of interference and multiple propagation paths, it consists, in order to reduce the number of filter coefficients to be adapted, in a second stage, of a synchronisation measurement process, of the estimation of the number of paths in the signal, the delay times associated with the various paths and their relative powers, and the frequency offset between the emission and reception of the signal in order to compensate for it, and wherein, in a third stage of multi-sensor equalisation, it consists in selecting a determined number of paths according to a determined criterion from the number of paths estimated in the synchronisation stage, in filtering via a spatial processing procedure the signal received by the receiver using the filters of the spatial part, in filtering via a temporal processing procedure the signal output by the spatial part using the filters of the temporal part, the respective coefficients of the filters of the spatial part and the temporal part being jointly and periodically recalculated at each iteration by an adaptive algorithm working at the symbol rate in order to minimise the estimation error produced between the receiver output signal and the response signal.

The invention also relates to a radio receiver featuring at least one multi-sensor spatial diversity equaliser consisting of a spatial part connected to a temporal part and receiving a digital radio signal composed of at least a learning sequence made up of symbols known to the receiver and an information sequence made up of useful symbols, featuring, in order to reduce the number of filter coefficients to be adapted in the spatial and temporal part in the presence of interference and multiple propagation paths:

at least two sensors connected to a unit carrying out the preliminary processing and synchronisation of the receiver input signal, the outputs of this unit being connected respectively to a first series of inputs and a second series of inputs of the spatial part of the equaliser, the first series of inputs corresponding respectively to the inputs of the spatial filters relating to each of the paths selected from a determined number of paths detected, and the second series of inputs corresponding respectively to the inputs of a unit for the calculation of the input signals of the transverse part of the temporal part of the equaliser, and wherein the transverse part of the temporal part features a transverse filter of determined coefficients, the temporal part also featuring a recursive part consisting of a decision module whose output is connected to the input of a recursive filter of determined coefficients, the recursive filter being located in a loop and receiving on its input the sum of the output signals of the spatial part and of the transverse part, from which is subtracted the signal output by the recursive part.

The process according to the invention on the one hand enables an improvement upon the performance of the various single-sensor equalisers currently in existence: in the case of a stationary environment, the process according to the invention enables an improvement of 10 log N in antenna gain, where N is the number of sensors, where the sensors are identical, with a gain of 3 dB on the phase realignment of the paths in the case of two stationary paths of the same power.

Moreover, the multi-sensor equalisation process according to the invention improves to an even greater extent the performance of single-sensor equalisation in the presence of flat fading on the various propagation paths.

The structure of a receiver according to the invention using a single-sensor equaliser also greatly reduces the number of coefficients to be adapted in comparison with the structure proposed by Scott et al, and can therefore be implemented on a HF or GSM channel.

BRIEF DESCRIPTION OF THE DRAWINGS

Other characteristics and advantages of the invention will be made clear in the following description, accompanied by the appended figures which represent, respectively.

DESCRIPTION OF THE PREFERRED EMBODIMENT

Figure 1:
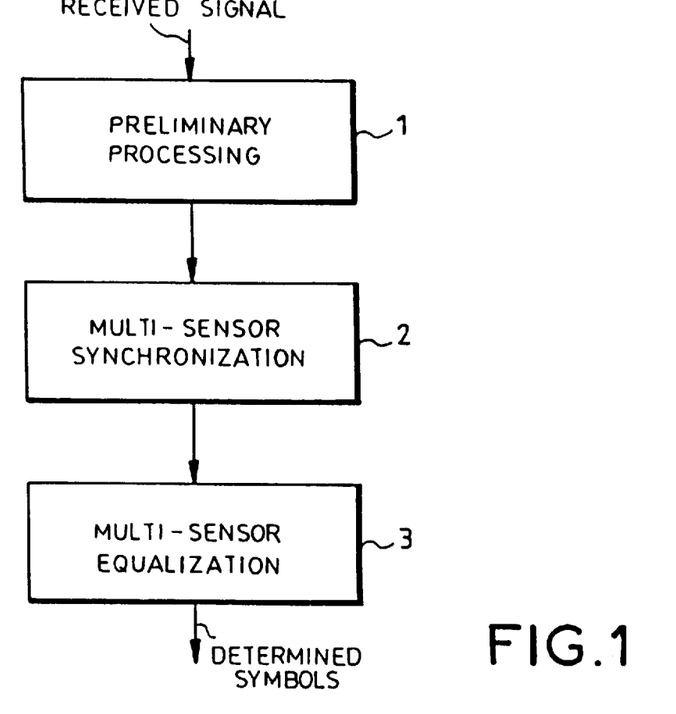
FIG. 1, the main stages of the process according to the invention.

Stage 1 of the process according to the invention represented in FIG. 1 consists of the preliminary processing of a digital signal received by at least two sensors $C_n$, where n=1 to N, of a radio receiver.

Stage 2 of the process according to the invention consists in synchronising the pre-processed received signal with an emitted signal consisting of synchronisation sequences known to the receiver in the presence of interference and multiple paths.

Synchronisation stage 2 necessarily precedes multi-sensor equalisation stage 3, which consists of spatial processing of the signal followed by temporal processing, both processing procedures being jointly adapted.

Figure 2:
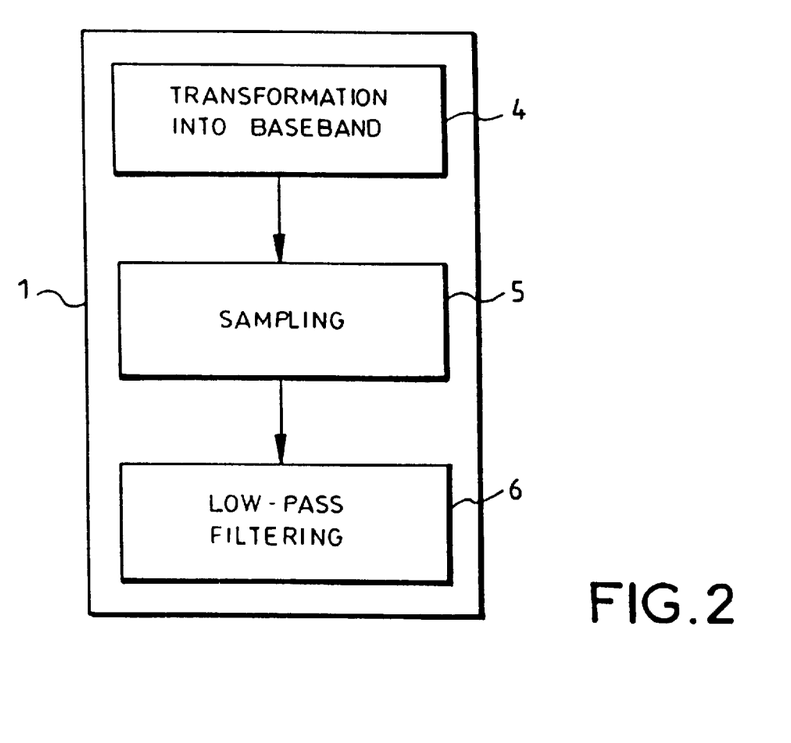
FIG. 2, the main stages of the preliminary processing stage.

Preliminary processing stage 1 is subdivided into three main stages 4, 5 and 6 as illustrated in FIG. 2:

stage 4 consists of the transformation of the radio signal output by sensors $C_n$ into a baseband signal;

stage 5 consists in sampling the transformed baseband signal at a rate Te, Te being a multiple of the symbol rate $T_s$, and stage 6 consists in filtering the sampled signal using a low-pass filtering procedure.

The pre-processed and synchronous signal derived from stages 1 and 2 is subsequently referred to as "the signal output by the reception channels".

Figure 3:
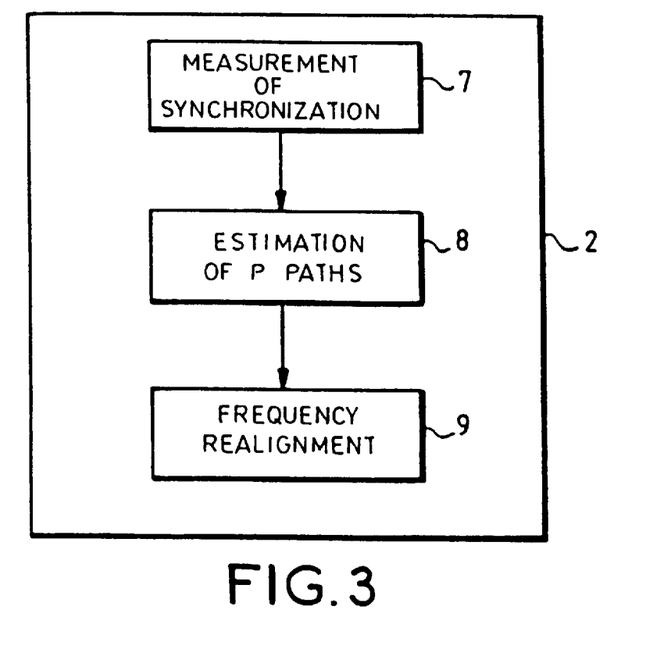
FIG. 3, the main stages of the synchronisation stage of the process according to the invention.

Multi-sensor synchronisation stage 2 is subdivided into three main stages 7, 8 and 9 as illustrated in FIG. 3:

stage 7 consists in measuring the synchronisation of the signal received by the sensors against learning sequences made up of symbols known to the receiver;

stage 8 consists in estimating of the number of paths followed by the useful signal as well as the delay times associated with these paths and their relative powers, and stage 9 consists in estimating the frequency offset between emission and reception. This frequency offset is compensated for before the multi-sensor equalisation stage is carried out.

Figure 4:
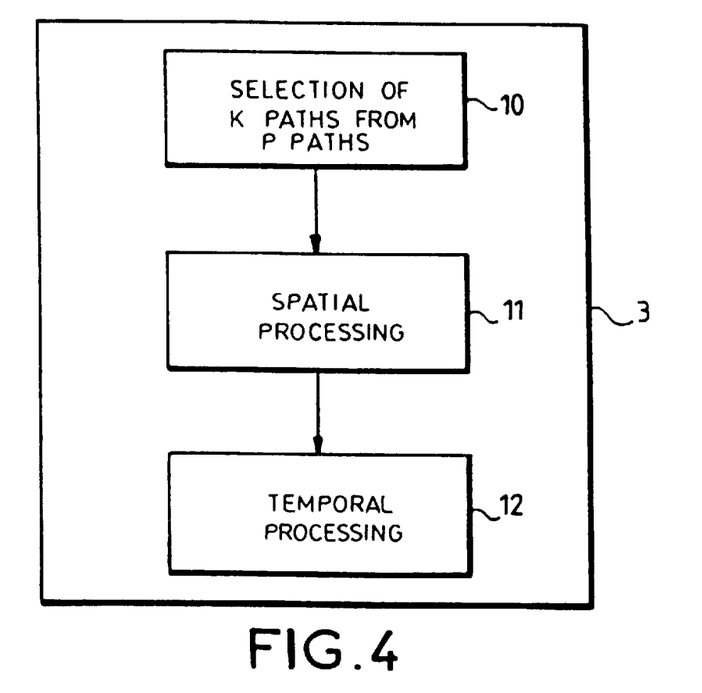
FIG. 4, the main stages of the multi-sensor adaptive equalisation stage of the process according to the invention.

Multi-sensor adaptive equalisation stage 3 is subdivided into five main stages 10 to 12 as illustrated in FIG. 4.

In stage 10 the process according to the invention chooses to adapt to K paths selected from the P paths identified at the end of synchronisation stage 2. This selection can be based on a number of different criteria:

limit the number of coefficients of the spatial processing component of the equalisation for reasons of calculation power or optimisation of the convergence speed, by imposing, for example, $K \leq 2$;

select all paths of which the relative power with respect to the main power is sufficiently great for phase realignment to be beneficial, for example a relative power of −5 dB;

use the two criteria described above simultaneously and concurrently.

Spatial processing stage 11 consists in filtering the input signal using filters disposed on each of the sensors making up the array, and phase realigns the contributions of all the paths selected, provided that these are sufficiently spaced in spatial terms, which implies a coefficient of spatial correlation between the different directing vectors which is "sufficiently" less than 1, as well as the positioning of the gain of the antenna in the direction of the useful signal.

Spatial processing stage 11 also rejects interference.

Temporal processing stage 12 consists in filtering the signal output by spatial processing stage 11 with a filter consisting of a transverse part and a recursive part, and combats any ISI remaining after the spatial processing of stage 11 due either to paths not selected in the algorithm or to paths which are spatially too close to one another for the spatial processing of stage 11 to be capable of separating them.

The coefficients of the filters used for the spatial and temporal processing associated respectively with stages 11 and 12 are jointly adapted to the symbol rate $T_s$ by the adaptation algorithm so as to minimise MQE between a response signal and the result of equalisation stage 3. The response signal consists either of known symbols belonging to a learning sequence or of "determined" symbols where the symbol in question belongs to an information sequence.

Figure 5:
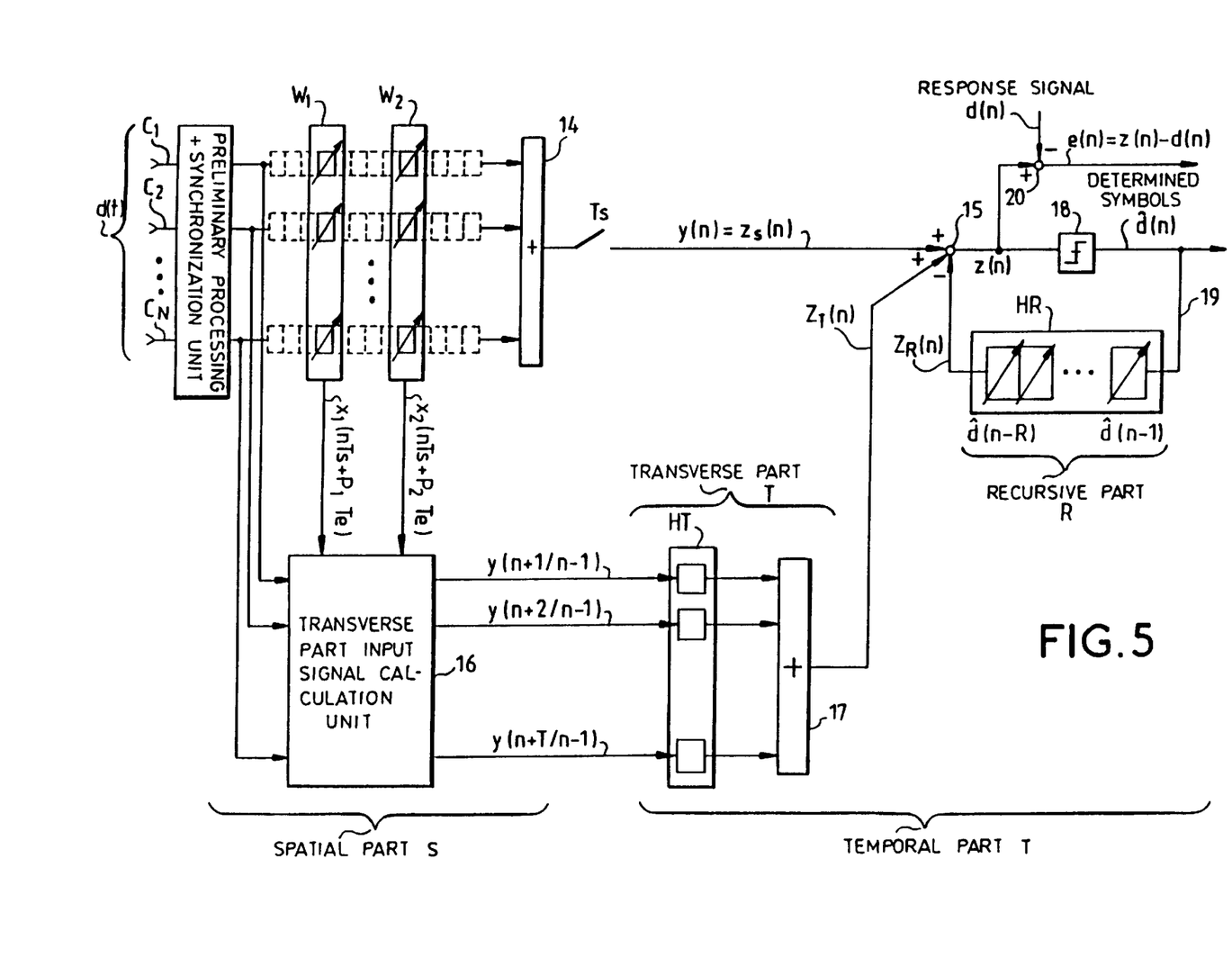
FIG. 5, an example structure of a radio receiver according to the invention.

A radio receiver according to the invention receiving a digital signal including learning sequences and information sequences is schematically illustrated in FIG. 5.

This receiver implements the process according to the invention and the description which follows is intended to aid understanding of its operation.

An emitted signal d(t) arrives at a reception array of a receiver according to the invention featuring a determined number of sensors $C_n$, where n=1 to N, after its journey through the ionospheric channel. Each of the P propagation paths followed by the signal is received by the antenna with a complex gain $\alpha_i(t)$ and undergoes a delay $\tau_i$ with respect to the emitted signal. The vector X(t) formed by the signals received by the sensors is determined by the following formula:

$$X(t) = \sum_{i=1}^{P} \alpha_i(t)d(t - \tau_i)S_i + B(t) \quad (1)$$

where: $S_i$ represents the direction vector associated with path i, and B(t) is added noise independent of the useful signal which takes into account the contributions of background noise and interference.

The non-stationary nature of the channel affects the amplitudes and phases of the various paths, hence the dependence in time of the quantities $\alpha_i(t)$. On the other hand, the delays $\tau_i$ are relatively stable over periods of the order of a quarter of an hour and can therefore be considered constant.

Sensors $C_n$ are respectively connected to the input of a preliminary processing and synchronisation unit 13 featuring conventional means, which are not represented, for the transformation of the signal received by sensors $C_n$ into a baseband signal, its sampling at the rate Te, its transformation into a baseband signal and its low-pass filtering, as well as conventional means for synchronisation in the presence of jamming. Each output of unit 13 corresponds to the reception channel associated with one of sensors Cn, and each supports a part of the complex baseband signal sampled at rate Te.

The estimated delay times can be expressed as a function of Te: $\tau_i = p_i$ Te, and the sampled signal X(nTe) received by the antenna can thus be written as follows:

$$X(nTe) = \sum_{i=1}^{p} \alpha_i d(nTe - p_i Te)S_i + B(nTe). \quad (2)$$

The structure of the multi-sensor equaliser connected at its output to unit 13 consists of a first part termed the "spatial part" and a second part termed the "temporal part". The dimensions S of the spatial part, which defines the number of coefficients required for its calculation, are determined by the product of the number K of paths selected at the end of stage 6 and the number N of sensors $C_1$ to $C_N$. The spatial part rejects any interference and positions the gain of the antenna equivalent to the array of sensors $C_n$ in the direction of the useful signal, and if possible realigns the phase of the multiple paths associated with the useful signal.

In a conventional multi-sensor equaliser such as that proposed by Scott et al, the spatial part consists of a Finite Pulse Response filter, or FPR, disposed on each reception channel. Each filter consists of a determined number of coefficients so as to cover the whole of the transmission channel. Each of these coefficients is represented in FIG. 5 by a broken line box. To cover a channel whose length in the HF band can be typically 5 ms, and with sampling at 3 kHz, the number of coefficients required on each channel is 3×5=15.

In the spatial part of the receiver according to the invention, the number of coefficients to be adapted is greatly reduced. Only K coefficients per channel, typically one, two or even three in the HF band, need to be calculated. Each coefficient selected is represented in FIG. 5 by a solid line box (K=2 in FIG. 5). These K coefficients per channel enable the definition of K vectors, each of these vectors respectively forming a vertical spatial filter $W_k$, where k=1 to K, represented by a solid line. Each of these filters $W_k$ weights a signal vector $X_k(n)$.

$X_k(n)$ is defined as the vector which enables the symbol d(n) on path k to be taken into account by the equaliser at moment n.

This structure therefore reduces the number of coefficients of the spatial part. The outputs of filters $W_k$ are summed by a first summing circuit 14 whose output, which delivers the signal $z_{S(n)}$, is connected to a first positive operand input of a first comparator 15, which also corresponds to a first input of the temporal part.

It should be noted that synchronisation step 2 has been carried out by oversampling the input signal d(t) with respect to the symbol rate, which enables the delays of the various paths to be estimated with greater precision at the synchronisation stage, and therefore means that the maximum possible amount of energy is recovered on each of the paths selected subsequently at multi-sensor equalisation stage 3.

The precision of the estimation of the delays is therefore particularly important in optimising the performance of the multi-sensor equaliser of the receiver according to the invention. In addition, the structure is not fixed, and synchronisation step 2 means that the spatial part of the structure can be monitored and updated when one of the paths disappears (fading hole) or appears, or when the delay times are modified, for example in the case of clock drift between emission and reception.

The spatial part also features a unit 16 for the calculation of the input signals of a first part of the temporal part termed the "transverse part". Calculation unit 16 receives the signals output respectively by the preliminary processing and synchronisation unit 13 on a first series of inputs, and receives signal vectors $X_k(n)$ output respectively by filters $W_k$ on a second series of inputs.

The operation of unit 16 is described in detail below.

The transverse part is designed to compensate for intersymbol interference (ISI) remaining in the signal at the output of the spatial part.

The transverse part receives the signals delivered by calculation unit 16 and features a transverse filter with T coefficients hereafter termed "HT". The outputs of filter HT are summed by a second summing circuit 17, whose output, which delivers the signal $z_{T(n)}$, is connected to a first positive operand input of comparator 15.

The output of comparator 15 is connected to a first input of a second part of the temporal part termed the "recursive part". The recursive part consists of a decision module 18 situated in a main circuit and a recursive filter hereafter termed "HR", with R coefficients, situated in a loop. This filter HR receives the signal delivered by the decision module on its input, and its output signal is delivered to a third negative operand input of comparator 15.

The output of comparator 15 is on the one hand returned to the input of decision module 18 and on the other hand delivered to a first positive operand input of a second comparator 20, which receives on a second negative operand input the response signal also termed response d(n). The output of second comparator 20 delivers a minimised error estimation signal e(n).

The output of the temporal part delivers the "determined" symbols.

The spatial and temporal parts are jointly adapted to the symbol rate Ts represented by a switch located between summing circuit 14 of the spatial part and the temporal part in such a way as to minimise a MQE criterion between the response signal also termed response d(t) and the multi-sensor equaliser output signal z(t).

Ideally, the optimised criterion for the calculation of the various filters $W_k$, HT and HR making up the structure is a criterion of MQE between output signal z(t) and response d(t). It is determined by the following formula:

$$\xi = E[|z(t)-d(t)|^2] \qquad (3)$$

Given that the statistics relating to the signals are not precisely known, the calculation of different filters $W_k$, HT and HR is carried out using an adaptive algorithm operating at symbol rate Ts and optimising for each iteration, i.e. for each sample n, a MQE criterion estimated using the following formula:

$$\hat{\xi}(n) = \frac{1}{n} \sum_{i=1}^{n} |z(i) - d(i)|^2. \qquad (4)$$

The adaptive algorithm is here defined for a stationary channel, and converges on the solution which obtains the minimum MQE between d(t) and z(t). In a non-stationary environment, the algorithm minimises MQE over a short period related to the degree to which the channel is non-stationary. This is achieved by weighting the MQE samples with a window which is generally exponential. The criterion to be minimised for each sample is determined by the following formula:

$$\hat{\xi}_\lambda(n) = \sum_{i=1}^{n} \lambda^{n-i}|z(i)-d(i)|^2 = \lambda\hat{\xi}_\lambda(n-1) + |z(n)-d(n)|^2, \qquad (5)$$

where $\lambda$ is the omission factor of the algorithm ($0 < \lambda \leq 1$). The stationary environment corresponds to an omission factor equal to 1. In order to follow channel variations as efficiently as possible, the algorithm must minimise $\hat{\xi}_\lambda(n)$ for each sample n of signal d(t), which means that it is necessary to know the response d(n) to each sample. The response is by definition only known on learning sequences. On information symbol sequences, it is possible to continue the algorithm's adaptation by using the principle implemented in the DFE equaliser, which first calculates the output z(n) obtained using the filters optimised at moment n−1 and then determines the symbol $\hat{d}(n)$. The symbol $\hat{d}(n)$ thus estimated is used as a response, $d(n)=\hat{d}(n)$, to carry out a new iteration of the algorithm.

For each sample n the signal z(n), on which decision module 18 works, is divided into three quantities derived respectively from the spatial part, the recursive part and the transverse part. Signal z(n) is therefore defined by the following formula:

$$z(n)=z_S(n)-z_R(n)+z_T(n) \qquad (6).$$

At the input of the spatial part, the following signal vectors, each one associated with one of sensors $C_n$, where n=1 to N, are used by the adaptive algorithm and have the following form:

$$X_k(n) = X(nTs + p_kTe) \quad \text{for } k = 1, \ldots, K \qquad (7)$$

$$\text{i.e.} X_k(n) = \alpha_k d(nTs) S_k + \sum_{i \neq k} \alpha_i d[nTs - (p_i - p_k)Te] S_i + B(nTs + p_kTe), \qquad (8)$$

where k corresponds to a determined path selected at synchronisation stage 1.

Thus, each one of these vectors $X_k(n)$ contains a part correlated with the response d(n), the term $\alpha_k d(nT_s) S_k$ and an ISI part which must be compensated for by the spatial part and/or the temporal part. The adaptive algorithm will seek to realign the phase of the different contributions of vectors $X_k(n)$ correlated with response d(n).

The advantage of the proposed structure is therefore clearly evident upon analysis of formula (8):

to phase realign the K paths arriving at the antenna, i.e. to "take advantage of" the energy of the K paths in the equaliser, it is not necessary to place a FPR filter on each sensor as in the multi-sensor equaliser proposed by Scott et al. The dimensions of the FPR filter must be linked to the size of the channel and therefore contain a large number K' of coefficients. All that is required is to insert one filter containing K coefficients, which is equivalent to selecting K coefficients from the K' coefficients making up the FPR filter of the multi-sensor equaliser proposed by Scott et al. The number of coefficients is therefore greatly reduced, which means that the adaptive algorithm can converge towards the optimum solution more quickly. Given that the algorithm adapts to the learning sequences, i.e. to a given number of iterations, the proposed structure therefore produces improved performance in comparison with the multi-sensor equaliser proposed by Scott et al. In addition, in order to guarantee good results in non-stationary environments, the number of coefficients to be adapted should be reduced as far as possible.

The output of the spatial part is expressed by the following formula, the weight vector weighting signal $X_k(n)$ being represented by $W_k$:

$$z_S(n) = y(n) = \sum_{k=1}^{K} W_k + X_k(n), \qquad (9)$$

where + in superscript represents the transposition-conjugation operation.

By using the notation $X_S(n)=[X_1^T(n) \ldots X_K^T(n)]^T$, where T in superscript represents the transposition operation in a vectorial space, to represent the input signal vector of the spatial part and $W_S=[W_1^T \ldots W_K^T]^T$ to represent the weighting vector of the spatial part, the output signal of the spatial part is expressed by the following formula:

$$z_S(n)=y(n)=W_S^+X_S(n) \qquad (10).$$

The output of the recursive part is written as a function of HR, the filter weighting the recursive part, and of symbols n−1 to n−R, and is expressed by the following formula:

$$z_R(n) = \sum_{i=1}^{R} HR_i^* d(n-i), \qquad (11)$$

where $d(n)=\hat{d}(n)$ on the information sequences, and where * in superscript represents the conjugation operation on complex numbers.

Symbols n−1 to n−R are either the known symbols in the learning sequences or the symbols, d(n)=d̂(n), determined during the previous iterations on the information sequences.

The input samples of the transverse part are calculated by calculation unit 16 on the basis of the signals output by unit 13 and from filters $W_k$ at instants n+1 to n+T, and are therefore dependent upon the weighting system of the spatial part. Two methods can be used in the algorithm for the calculation of these samples:

a first method consists in updating all the samples of the transverse part with the vector $W_S(n-1)$ calculated at the previous iteration using the following formula:

$$y(n+k/n-1)=W_S(n-1)^+X_S(n+k) \quad k=1,\ldots,T \tag{12}$$

A second method can be used which enables the optimisation of the calculation power:

under this second method the transverse part consists of a delay line.

For the symbol n, the algorithm therefore calculates only the sample y(n+T/n−1) on the basis of the weighting vector $W_S(n-1)$, the other samples having been calculated during the previous iterations. y(n+T−1/n−1) is therefore calculated on the basis of weighting vector $W_S(n-2)$, y(n−T−2/n−1) on the basis of $W_S(n-3)$ and so on.

On the basis of samples y(n+k/n−1) calculated using one of the above methods, the output of the transverse part is expressed by the following formula:

$$z_T(n) = \sum_{i=1}^{T} HT_i^* y(n+i/n-1), \tag{13}$$

where HT is the filter of the transverse part.

At each iteration of the algorithm for the update of the system of filters (W, HR, HT) making up the system, the samples of the transverse period y(n+k/n−1) for k=1, ..., T must be calculated first. The samples thus calculated become the input of the adaptation algorithm in the same way as the vector X(n) and the symbols corresponding to the previous iterations d(n−1) to d(n−R). The adaptation algorithm then seeks the system (W(n), HR(n), HT(n)) which minimises the criterion $\xi_\lambda(n)$.

Figure 6:
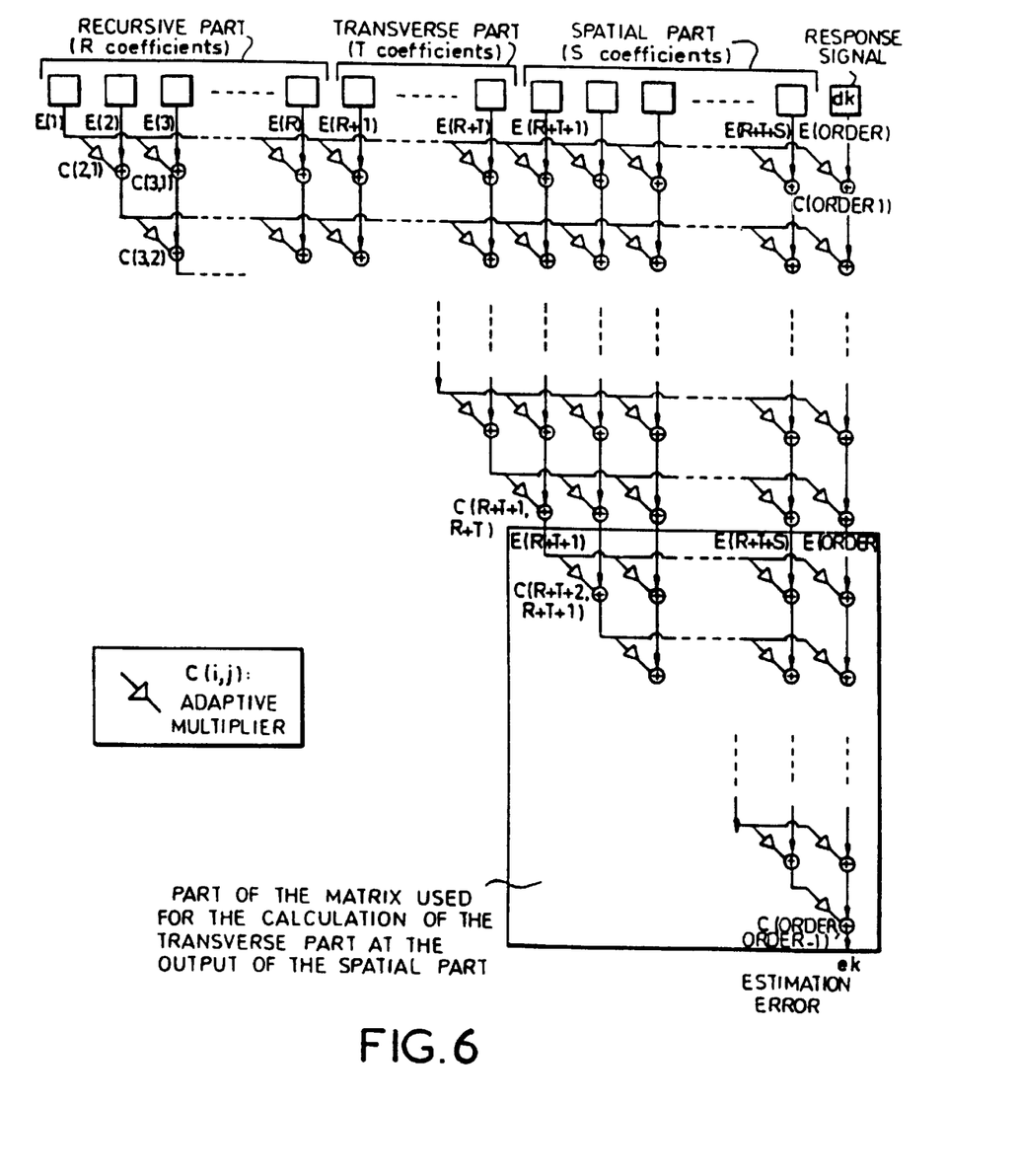
FIG. 6, an algorithm of the spatial matrix used by the process according to the invention.

Different algorithms can be used to calculate the filter system (W, HR, HT) giving the minimum value of estimated MQE $\xi_\lambda(n)$ for each iteration. The algorithm selected is a least squares algorithm, which is chosen in preference to a gradient algorithm for reasons of speed of convergence. Of the least squares algorithms available, the spatial matrix algorithm illustrated in FIG. 6 is used to provide joint adaptation of the spatial and temporal part. Any other least squares algorithm would produce the same basic results.

The spatial matrix algorithm does not estimate the filter system (W, HR, HT) directly. At each iteration the samples corresponding to the spatial, recursive and transverse parts are fed into the matrix structure and the coefficients of the matrix C(i, j), which are also termed adaptive multipliers, are calculated so as to minimise the power of the estimation error e(n)=z(n)−d(n). The spatial matrix algorithm exists in two versions: the "a priori" version and the "a posteriori" version. The "a priori" version is expressed by the following series of instructions, based on the one hand on the known sequence symbols;

the order of the matrix is noted: order = R+T+S+1.
in an initialisation phase:
i=1—>R    E(i)=d(n−i)      initialisation of the recursive part -continued i=1—>T    E(R+i)=y(N+i/n−1)    initialisation of the transverse part
i=1—>S    E(R+T+i)=x(i)    initialisation of the spatial part, where
                                   x(i) is the ith component of vector X(n)
i = Order    E(Order)=d(n)    initialisation of the response signal
then from p = 1—>Order:
$\alpha(p) = \lambda\alpha(p)+\gamma(p-1)\|E(p)\|^2$
$\gamma(p) = \gamma(p-1)-\gamma(p-1)^2\|E(p)\|^2/\alpha(p)$
i=p+1—>Order:
     E(i)=E(i)−C(i,p)*E(p)
     C(i,p)=C(i,p)+γ(p−1)E(p)E(i)*/α(p)

and on the other hand on the information symbol sequences:

the initialisation phase is identical to the preceding initialisation phase, apart from the fact that E(Order) is not initialised as the response is not known. The response must therefore be estimated. To do this, the adaptation algorithm first updates the various quantities involved in the spatial matrix algorithm which have no effect upon E(Order), i.e.:

from p=1−>Order−1:

$$\alpha(p)=\lambda\alpha(p)+\gamma(p-1)\|E(p)\|^2$$

$$\gamma(p)=\gamma(p-1)+\gamma(p-1)^2\|E(p)\|^2/\alpha(p)$$

then from i=p+1 Order−1:

$$E(i)=E(i)-C(i,p)*E(p)$$

$$C(i,p)=C(i,p)+\gamma(p-1)E(p)E(i)*/\alpha(p)$$

The output of the multi-sensor equaliser is then calculated using the different error signals and is expressed by the following formula:

$$z(n) = \sum_{i=1}^{\text{Order}-1} C(\text{Order}, i)*E(i). \tag{14}$$

Decision module 18 then determines signal d(n) on the basis of z(n) and updates the final part of the matrix structure:

in an initialisation phase:

$$E(\text{Order})=d(n)$$

then from p=1 Order−1:

$$E(\text{Order})=E(\text{Order})-C(\text{Order},p)*E(p)$$

$$C(\text{Order},p)=C(\text{Order},P)+\gamma(p-1)E(p)E(\text{Order})*/\alpha(p)$$

For the calculation of the transverse part at each iteration, the samples of the transverse part, i.e. the samples obtained at the output of the spatial part for X(n+1), ..., X(n+T), must be calculated first.

The output of the spatial part corresponds to the contribution of the spatial part to the signal subtracted from the response. The signal subtracted from the response is expressed on the basis of the different error signals E(1)->E(Order−1) by the following formula:

$$z = \sum_{i=1}^{\text{Order}-1} C(\text{Order}, i)*E(i). \tag{15}$$

In order to calculate the output of the spatial part corresponding to X(n+k) where k=1−>T, it is therefore necessary to simply calculate the contribution of the spatial part to the different error signals. In order to reduce the calculation power, the samples corresponding to the spatial part are placed on the right of the matrix, and it is therefore only necessary to calculate the contribution of the spatial part to error signals E(R+T+1) to E(R+T+S): this means that only that part of the matrix marked by the solid line in FIG. 6 is involved in the calculation.

Let us suppose that Es(i) is the contribution of the spatial part to error signal E(i). Es(i) is thus calculated using the following series of instructions:

--- in an initialisation phase:
    Es(i+R+T)=x(i)            for i + 1—>S, where x(i) is the ith
                                     component of vector X(n+k).
then for 1 = R+T+1—>R+T+S, update of error signals Es(j) for j = i+1—>R+T+S
on the basis of error signal Es(i):
    i = R+T+1—>R+T+S
    j = i+1—>R+T+S         Es(j)=Es(j)−C(j,i)*Es(i).

---

The output of the spatial part is thus expressed as a function of error signals Es(i) calculated above by the following formula:

$$y = \sum_{i=R+T+1}^{Order-1} C(Order, i)*E(i) \quad (Order - 1 = R + T + S). \tag{16}$$

The following example demonstrates the relative usefulness of the spatial and temporal parts of the multi-sensor equaliser.

A useful signal arrives at the antenna along two propagation paths.

The signal vector received by the antenna is expressed by the following formula:

$$X(t)=\alpha_1 d(t)S_1+\alpha_2 d(t-\tau)S_2+B(t) \tag{17}$$

According to formula (7), the spatial part of the structure is composed of the vectors X(t) and X(τ+t). The output of the spatial part y(t) is therefore expressed as follows:

$$y(t)=W_1^+X(t)+W_2^+X(t+\tau) \tag{18}$$

That is:

$$y(t)=d(t)[\alpha_1 W_1^+S_1+\alpha_2 W_2^+S_2]+d(t-\tau)[\alpha_2 W_1^+S_2]+d(t+\tau)[\alpha_1 W_2^+S_1]+W_1^+B(t)+W_2^+B(t+\tau) \tag{19}$$

The output of the spatial part therefore consists of three components: one component corresponding to the useful signal d(t), one component corresponding to the ISI generated by d(t−τ) and d(t+τ), and one component corresponding to the noise (background noise+interference).

Let us now suppose that the temporal part of the structure is absent: T=R=0. The algorithm adapting the structure minimises the MQE between y(t) and d(t), and therefore seeks to cancel the two terms containing ISI, since these are non-correlated with respect to response d(t). ISI is processed by the antenna in the same way as any possible interference.

Figure 7:
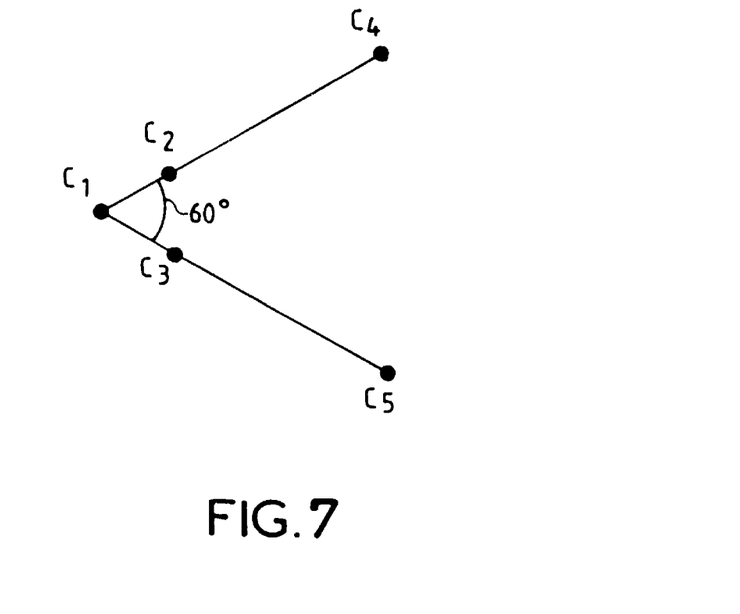
FIG. 7, an array of antennas used by the receiver according to the invention.

The following simulation is designed to analyse the behaviour of such a structure without a temporal part. An example antenna used for the simulation featuring five monidirectional sensors $C_1$ to $C_5$ disposed on the sides of an equilateral triangle is illustrated in FIG. 7. The angle between any two sides of the triangle is 60°.

The antenna receives two non-correlated paths of identical bearing of 0° and of power $\pi_s$=10 dB. The elevation of the first path is 40° and that of the second path is varied. The background noise has a power of $\sigma^2$=0 dB. The output powers of the useful signal, the ISI and the background noise are expressed respectively by the formulas given below:

$$S=|\alpha_1 W_1+S_1+\alpha_2 W_2^+S_2|^2=\pi_s[W_1^+S_1+W_2^+S_2]^2 \tag{20}$$

$$IIS=\pi_s[|W_1^{30}S_2|^2+|W_2^+S_1|^2] \tag{21}$$

$$B=W_1^+Rbb\ W_1+W_2^+Rbb\ W_2=\sigma^2[W_1^+W_1+W_2^+W_2] \tag{22}.$$

Figure 8:
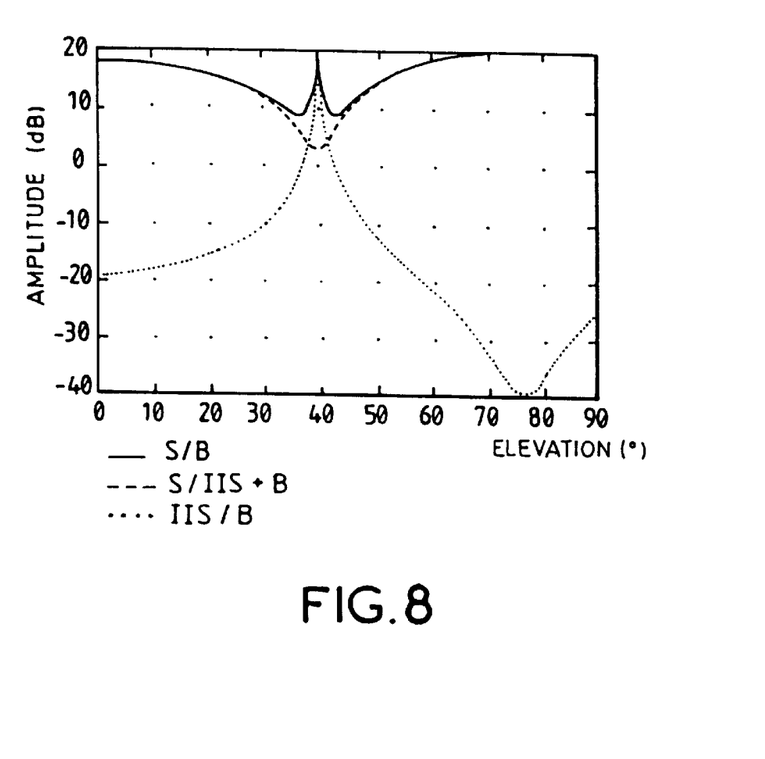
FIG. 8, a graphic representation demonstrating the importance of the spatial part in the structure of the equaliser of the receiver according to the invention.

In FIG. 8, the curves S/(ISI+B), S/B, ISI/B are traced on a Cartesian co-ordinate graph, on which the y-axis represents the amplitude in dB and the x-axis represents the elevation angle in degrees. The antenna processes ISI in the same way as interference, and therefore optimises the ratio S/(ISI+B).

When the coefficient of spatial correlation between the two paths is low, the ratio S/(ISI+B) at the output of the antenna is close to 20 dB. The determination of the symbols emitted is carried out on signal y(t), which means that the same performance as on a stationary channel featuring one path of power 20 dB is obtained. In comparison, the single-sensor DFE equaliser produces performances similar to those of a stationary channel featuring one path of power 10 dB. The processing carried out therefore enables a gain of 10 dB, a gain which is made up as follows:

0.7 dB=10 log N due to the gain in S/B of the antenna aligned in the direction of each of the two paths.

−3 dB due to the phase realignment gain of the two paths.

In such a configuration, the spatial part eliminates ISI, directs one lobe in the direction of each of the two paths and phase realigns the two paths. The temporal part no longer makes any useful contribution.

When the two paths are close in spatial terms, it becomes more and more difficult for the antenna to eliminate ISI while at the same time maintaining a S/B gain which is sufficient for the two paths.

Thus, for elevations ≦36° or ≧44°, the antenna is always able to reject ISI below the level of the background noise, but this is achieved at the cost of a deterioration of the S/(ISI+B) ratio with respect to the previous case (at 36°, 12 dB are lost). The performance of the decision module is therefore lower than in the previous case.

For elevations between approximately 36° and 44° the two paths are too close in spatial terms, and the antenna is no longer capable of eliminating ISI. The ratio S/(ISI+B) tends towards 3 dB. It should be noted that this result is obtained whatever the value of the common power of the two paths. A decision module placed at the output of the spatial part would therefore give less satisfactory results than the single-sensor DFE equaliser, which is evidently unacceptable.

The disadvantage of such a structure without a temporal part is therefore clear from the analysis of this example: ISI is processed by the antenna in the same way as interference, and the antenna therefore uses varying degrees of liberty to eliminate it.

The addition of a temporal part to the structure and the adaptation of the temporal and spatial parts to the same error signal results in the overall behaviour described below.

For paths which are "sufficiently" non-correlated in spatial terms, the spatial part enables the system in all cases to direct the main lobe of the antenna in the direction of each of the two paths and to realign their phase, while at the same time eliminating ISI. The work of the temporal part is therefore reduced. The overall gain with respect to the single-sensor DFE equaliser is 10 log N+3 dB.

For spatially correlated paths the temporal part handles the elimination of ISI, which means that the spatial part will no longer seek to optimise the antenna gain in the direction of each of the two paths. The overall gain with respect to the single-sensor DFE equaliser is 10 log N.

A gain with respect to a single-sensor DFE equaliser of between 10 log N and 10 log N+3 dB for two paths of the same power in a stationary environment can therefore be realised in all cases.

Moreover, in the presence of jamming of a useful signal, the spatial part will reject interference.

What is claimed is:

1. A process for multi-sensor equalization in a radio receiver having a spatial portion connected to a temporal portion including respectively a determined number of filters and receiving a radio signal (d(t)) including at least a learning sequence made up of symbols known to the receiver and an information sequence made up of useful symbols, said process comprising the steps of:

transforming, in a first stage for the preliminary processing of the signal received by the receiver, of the signal received by at least two sensors ($C_n$) into an equivalent base band signal, and sampling the base band signal at a rate (Ta) which is a multiple of a symbol rate ($P_s$), and filtering of the sample signal using a low-pass filtering process;

estimating, in a second synchronization stage of a synchronization measurement process, in the presence of interference and multiple propagation paths, in order to reduce the number of filter coefficients to be adapted, of the number of paths (P) in the signal (d(t)) and the delay times associated with the various paths and their relative powers, and estimating frequency of said between emission and reception of the signal in order to compensate for said frequency;

selecting, in a third multi-sensor equalization stage, a determined number of paths (K) according to a determined criterion from said number of paths (P) estimated in said second synchronization stage, and filtering, via a spatial processing procedure, the signal received by the receiver using filters ($W_k$) of the spatial portion, and filtering, via a temporal processing procedure, the signal obtained by the spatial portion using filters of the temporal portion (HT and HR), and jointly and periodically recalculating at each iteration, the respective coefficients of the filters of the spatial portion ($W_k$) and the temporal portion (HT and HR), by an adaptive algorithm functioning at said symbol rate ($T_s$) in order to minimize estimation error (e(t)) produced between a receiver output signal (z(t)) and the signal (d(t)).

2. Process as claimed in claim 1, wherein there corresponds to each path (K) selected at each iteration (n) a signal vector ($X_k(n)$), and consisting in filtering in the spatial processing stage each signal vector ($X_k(n)$) using a filter ($W_k$) of the spatial part, and in calculating on the basis of the result of the filtering of the previous iteration (n−1) and the paths (K) selected at the current iteration (n) the input signals of the transverse part of the temporal part of the equalisation.

3. Process as claimed in claim 1, consisting in the temporal processing stage in filtering in the transverse part of the temporal part the signals output by the filters ($W_k$) of the spatial part, in summing the output signal of the spatial part with the output signal of the transverse part, and in subtracting the signal derived from the recursive part of the temporal part from this sum, the recursive part using a filter (HR) to filter the symbols of the previous iterations, which are the symbols "determined" on the basis of the information sequences or the known symbols of the learning sequences, in order to deduce the output signal (z(n)) of the receiver.

4. Process as claimed in claim 1, wherein the criterion consists in selecting a maximum determined number of paths in order to limit the number of coefficients to be calculated in the spatial part.

5. Process as claimed in claim 1, wherein the criterion consists in selecting the paths whose relative power with respect to a main path is greater than a determined threshold in order to limit the number of coefficients to be calculated in the spatial part.

6. Process as claimed in claim 1, wherein the criterion consists in using selecting simultaneously a maximum determined number of paths and the paths whose relative power with respect to a main path is greater than a determined threshold in order to limit the number of coefficients to be calculated in the spatial part.

7. Process as claimed in any of claim 1, wherein the adaptive algorithm consists in minimising the Mean Quadratic Error (MQE) between the receiver output signal (z(n)) and a response signal (d(n)) composed of known symbols in the learning sequences and determined symbols in the information sequences by weighting the MQE samples at the symbol rate.

8. Process as claimed in any of claim 1, wherein the adaptive algorithm is a spatial matrix algorithm.

9. A radio receiver having at least one multi-sensor spatial diversity equalizer, comprising:

a spatial part connected to a temporal part for receiving a digital radio signal (d(t)) including at least a learning sequence having symbols known to the receiver and an information sequence consisting of useful symbols, wherein, in order to reduce the number of filter coefficients to be adapted in the spatial and temporal parts in the presence of interference and multiple propagation paths, said receiver further comprising:

at least two sensors ($C_n$) connected to a unit for carrying out the preliminary processing and synchronization of the receiver input signal wherein the outputs of said unit are connected respectively to a first series of inputs and a second series of inputs of said spatial part of said equalizer and wherein the first series of inputs corresponds respectively to the inputs of spatial filters ($W_k$) relating to each of a first plurality of paths (K) selected from a second plurality (P) of detected paths and wherein said second series of inputs correspond respectively to the inputs of a calculation unit for calculation of input signals of transverse portions of said temporal part of said equalizer, and wherein said transverse portion of said temporal portion further includes a transverse filter (HT) having a plurality (T) of determined coefficients and wherein said temporal part includes a recursive portion consisting of a decision module whose output is connected to the input of a recursive filter (HR) of a plurality (R) of determined coefficients wherein said recursive filter (HR) is located in a loop and wherein said recursive filter has an input for receiving a sum of output signals of said spatial part and of a transverse part ($z_S(n)+z_T(n)$), and wherein a recursive filter (HR) output signal (zR(n)) is subtracted from said sum of said output signal.

* * * * *